Inventor
David Harry Mawby
By Kemon, Palmer, Stewart & Estabrook
Attorneys

Sept. 28, 1965 D. H. MAWBY 3,209,070

COLOUR REPRODUCTION SYSTEMS

Filed June 2, 1961 4 Sheets-Sheet 2

Inventor

David Harry Mawby

By

Kemon, Palmer, Stewart & Estabrook

Attorneys

Inventor
David Harry Mawby
By Kemon, Palmer, Stewart & Estabrook
Attorneys

Inventor
David Harry Mawby
By Kemon, Palmer, Stewart & Estabrook
Attorneys 3,209,070

COLOUR REPRODUCTION SYSTEMS

David Harry Mawby, Tackleway, Hastings, England, assignor to Crosfield Electronics Limited Filed June 2, 1961, Ser. No. 114,450
Claims priority, application Great Britain, June 7, 1960, 19,960/60
12 Claims. (Cl. 178—5.2)

This invention relates to reproduction of colour originals by the four-colour method, that is to say the method in which three colour printers and a black printer are used.

Theoretically, a black printer can be used to replace at any element of a reproduced picture an amount of each colour equal to the minimum of the three colours present. As an example, if the minimum colour at a given element of the printer plates is magneta, the black printer can replace all the magneta together with equal amounts of cyan and yellow, leaving the remaining cyan and yellow to be provided by the corresponding printer plates. In this way, the black printer provides the whole of the neutral component of any element of the picture. In colour reproduction systems employing electronic circuits the black printer signal and undercolour removal signals are usually obtained by electronic selection of the smallest colour signal. Colour signals in this context are considered to increase from white to black regardless of whether they are varying from white to black in a positive or negative sense, or whether negatives are being scanned (in which case the smallest colour signal corresponds to the smallest amount of light received) or whether positives are being scanned (in which case the smallest colour signal corresponds to the largest amount of light received). Thus, the signal corresponding to white in the original may be considered to be "zero" signal and the signal whose level is closest to it for any given condition may be considered to be the minimum or smallest colour channel signal, the amplitude of the colour channel signal being its displacement from the white (zero) level. Black printer information may also be obtained by deriving signals from a separation image in which the neutral tones predominate over the colours (for example a white light negative). However, it has been found that it is sometimes desirable to reduce or dispense with black ink in coloured areas which contain only a low neutral component.

According to the present invention, the black printer or a colour printer from which undercolour has been removed is obtained by using an electro-optical scanner for scanning the coloured original or colour separation images thereof to derive colour channel signals representing the colour components of the elements of the original; selecting for each scanned element the minimum colour channel signal, representing the neutral component of the scanned element; and exposing an element of the black printer photographic emulsion, or modifying the exposure of an element of a colour printer photographic emulsion to remove undercolour from the latter, as a function of the minimum colour channel signal for the corresponding element of the original only when the remaining colour channel signals or the larger of the remaining colour channel signals for the said element is not in excess of the minimum colour channel signal to more than a predetermined extent. This predetermined extent may be a predetermined ratio or difference, or a value which varies in a predetermined manner in accordance with the actual ratio or difference. The minimum colour channel signal may conveniently be subtracted from the maximum colour channel signal to obtain a further signal representing the excess of the maximum colour component over the neutral component. In the preferred embodiment, the minimum signal is amplified with respect to the maximum signal and the maximum signal is then subtracted from the minimum signal, to obtain positive-going signals for elements which are predominantly neutral and negative-going signals for areas which are predominantly coloured, or vice-versa. This resultant signal can then be applied to a non-linear circuit which passes only signals of one polarity. The signal which is used to control the exposure of the black printer, that is to say the signal representing areas which are predominantly neutral, may also be used for neutral compression of the colour separation printers, the black printer signal being applied to the grid of the cathode ray tube in a sense such that neutral or nearly neutral tones, i.e. the tones corresponding to the black printer signals, are compressed in the exposed photographic colour printer plate.

In order that the invention may be better understood, several embodiments will now be described, by way of example, with reference to the accompanying drawings in which:

FIGURE 1 is a block circuit diagram of a computer for deriving the black printer signal from the colour channel signals;

FIGURES 2*a* to 2*k* are explanatory diagrams illustrating the operation of the apparatus of FIGURE 1;

Figure 1:
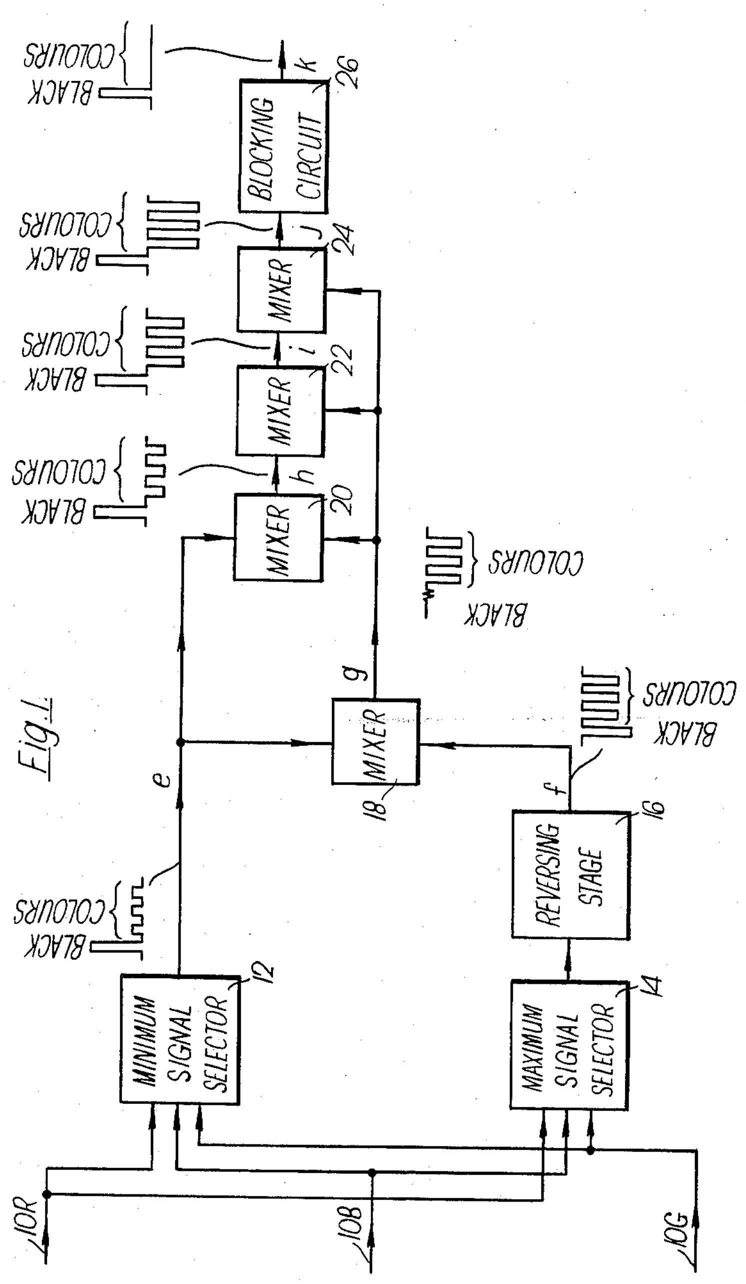
Figure 2:
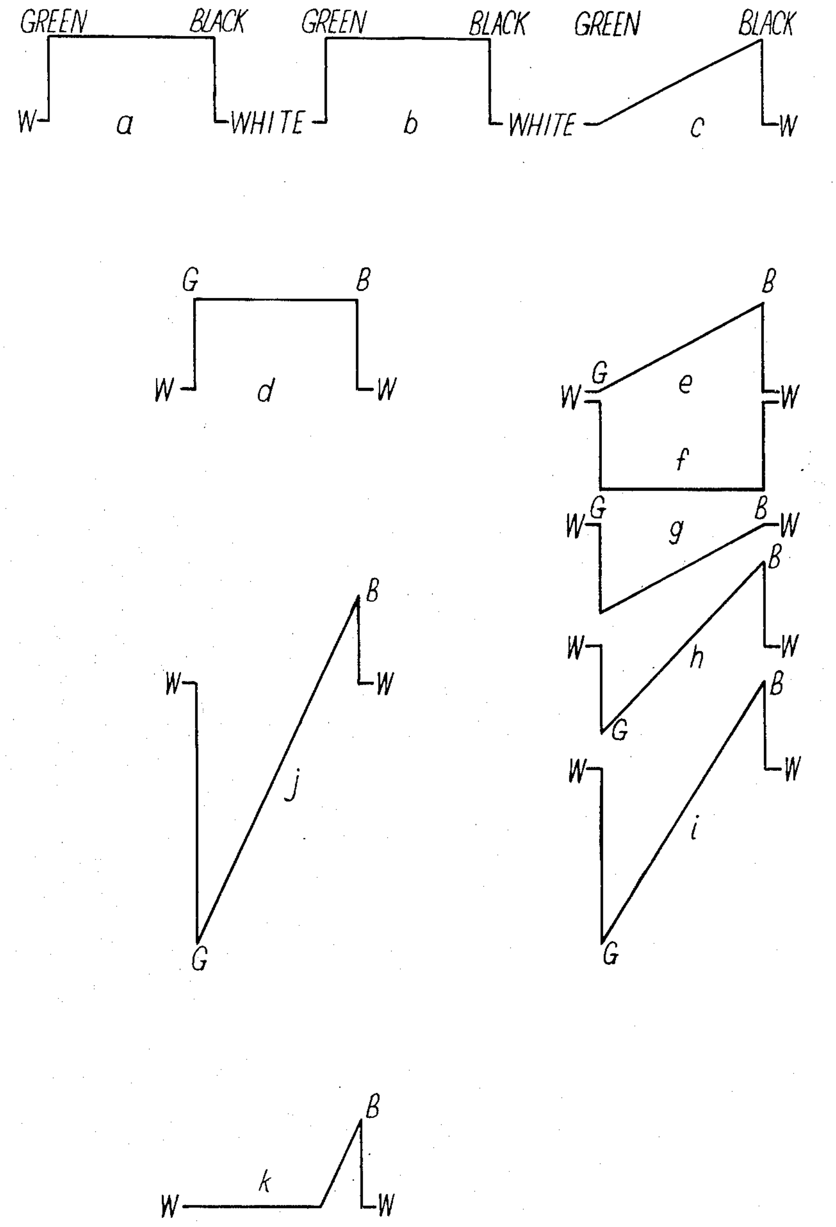

In FIGURE 1, the colour channel signals from the electro-optical scanner, which may be of any convenient type, are received by the computer over the conductors 10R, 10B and 10G and are applied both to a minimum signal selector circuit 12 and a maximum signal selector circuit 14. It is assumed for the purposes of the following description that the photomultiplier heads of the scanner are provided with single-stage amplifiers, and the signals at the outputs of the selectors circuit are therefore shown with positive polarity. Minimum signal selector circuits and maximum signal selector circuits are well known in themselves, and usually consist of parallel diodes, each receiving at its anode or cathode one of the signals, the cathodes or anodes of the diodes being connected to a common resistor. The voltage across the common resistor depends upon the maximum or minimum signal applied to the diodes, depending upon the direction in which the diodes are connected, and this voltage biases the remaining diodes to a non-conducting condition.

The signal from the maximum signal selector circuit 14 is passed to a reversing stage 16 and is then combined in a mixer 18 with the signal from the minimum signal selector circuit 12. The waveforms shown adjacent the circuit elements of FIGURE 1 represent the effect of scanning successively over a block element and three elements containing a low neutral component but at least one large colour component. It will be seen that the signal from the circuit 12 is large in areas which are black or dark grey and small for areas having a small neutral component, although these areas may have one or possibly two large colour components. The signal from the circuit 16 is of opposite polarity and is also large for areas which are black or dark grey, but in addition this circuit provides large signals for areas which have at least one large colour component. Assuming the amplication factors of the channels to have been equal, the signals from the circuit 16 must always be at least as large as those from the circuit 12 for the corresponding elements, since the maximum colour component must be at least as large as the minimum colour component. Therefore, when the two signals are added in opposite polarity in the mixer 18, the resulting waveform consists of a succession of negative-going signals representing for any element of the scanned image the amount by which the maximum colour component exceeds the minimum colour component. This waveform is applied to a further mixer 20, in which it is added to the positive-going signals from the minimum signal selector circuit 12, with the result that areas in which the neutral component is greater than the amount by which the maximum colour component exceeds the neutral component are represented in the output signal from the mixer 20 by positive signals, and areas in which the neutral component is less than the said amount continue to be represented by negative signals. The signal from the mixer 20 is added to the negative-going signals from the mixer 18 in a further mixer 22, the output of which contains positive-going signals only for areas in which the neutral component is greatly in excess of the amount by which the maximum colour component exceeds the neutral component. This effect is intensified by passing the output of the mixer 22 to a further mixer 24 in which it is again added to the negative-going signals from the mixer 18. The output of the mixer 24 is then applied to a blocking circuit 26 which passes only the positive-going signals, that is to say only signals corresponding to areas which are neutral or almost neutral in tone. This signal is used to modulate a light source, for example a cathode ray tube, which scans the photographic emulsion which is to form the black printer.

The operation of the apparatus may be better understood from the waveforms of FIGURES 2*a* to 2*k*, which represent the result of scanning across an area which shades progressively from pure green at one side to black at the other side. In the final print, the pure green elements will be printed by superimposing maximum cyan and maximum yellow inks, with a total absence of magenta ink, which would absorb green. The black elements will be printed by superimposing the maximum amounts of all three inks. Therefore in scanning across the area in question through a red filter (cyan printer), a maximum signal is developed for the whole of the scanning line, as shown in waveform *a*. In scanning across the area through a blue filter (yellow printer) a maximum signal is also developed for the whole of the scanning line, as shown in waveform *b*. However, when scanning across the area through a green filter (magenta printer), the signal which is developed varies from zero at the pure green end of the scanning line to maximum at the black end of the scanning line, as shown in waveform *c*. Waveform *d* shows the largest selected signal, that is to say the output of circuit 14 of FIGURE 1, and this is seen to be equal to the waveforms *a* and *b*. Waveform *e* shows the smallest of the signals, that is to say the output of the circuit 12 in FIGURE 1, and this is seen to be equal at all points to waveform *c*. Waveform *f* is waveform *d* reversed in polarity, as at the output of the circuit 16, and waveform *g* represents the output of the mixer 18, that is to say the sum of wavefroms *e* and *f*. This waveform is entirely negative and is most negative where the maximum colour channel signal exceeds the neutral component signal by the greatest amount, that is to say at the pure green end of the scanning line where the neutral component is zero. Waveform *h* of FIGURE 2 represents the output of mixer 20, that is to say the sum of waveforms *e* and *g*, and it will been seen that the first half of the scanned line, corresponding to areas in which the maximum colour channel signal is more than twice as large as the neutral component signal, is represented by negative-going signals, and the second half of the scanned line, corresponding to areas in which the maximum colour channel signal is less than twice the neutral component signal, is represented by positive-going signals. Waveform *i*, corresponding to the output from mixer 22 is positive only for areas for which the neutral component signal represents at least two-thirds of the maximum colour channel signal, and wavefrom *j*, representing the output of mixer 24, is positive only for areas in which the neutral component signal is at least three quarters of the maximum colour channel signal. Waveform *k* represents the output of the blocking circuit 26, which removes the negative-going signal.

It will thus be seen that with this arrangement, the black printer will be effective only in areas, in which the colouration consists almost entirely of the neutral component.

It will be appreciated that the number of mixing stages is not limited to that illustrated in FIGURE 1, and that a larger number or a smaller number may be used, depending on the printer's individual preference.

Figure 3:
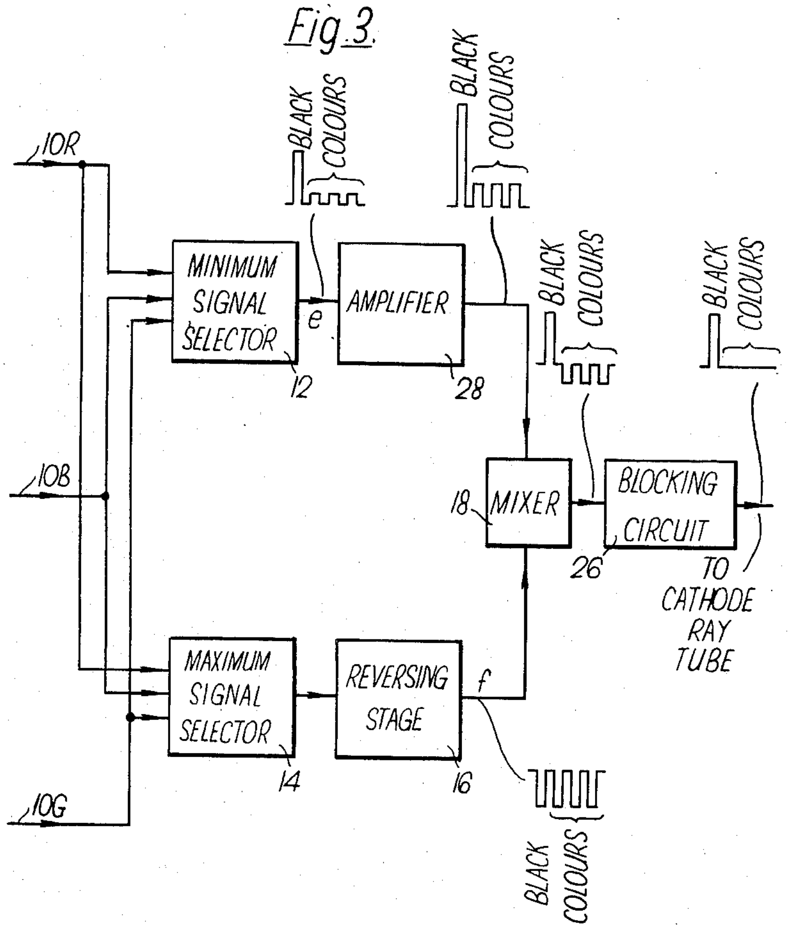
FIGURE 3 is a block circuit diagram of an alternative embodiment of the invention.

FIGURE 3 shows an alternative circuit in which a similar result is obtained by amplifying the output of the minimum signal selector circuit 12 in relation to the output of the maximum signal selector circuit 14. This amplification is carried out in the amplifier 28, and the amplification factor is selected in accordance with the extent to which it is desired to restrict the black printer to areas which are predominantly neutral. The closer the amplification factor to one, the more the positive signals from the mixer 18 will be restricted to areas in which the colouration consists almost entirely of the neutral component. A typical value for the amplification factor is 3. The output of the mixer 18 is then applied directly to the blocking circuit 26, the output of which is used to modulate the light source which exposes the black printer as in the case of FIGURE 1. If desired, the signals from the circuits 12 and 16 may be added in suitable proportion in an attenuating network and the resultant is then amplified and applied to the blocking circuit.

The signals from the blocking circuits 26 in FIGURES 1 and 3 can also be used to effect undercolour removal from the colour separation transparencies, which is in this case more accurately described as neutral compression. The signal from the blocking circuit may be subtracted from the colour printer information either optically or electronically. Thus it may be applied to the grid of a cathode ray tube which is exposing through a colour separation transparency a photographic emulsion from which the colour printer is to be made, so that a correction light mask is formed on the face of the cathode ray tube. Alternatively, the subtraction may be performed electronically by deriving a colour channel signal representing the density of the colour separation transparency and subtracting from this in a conventional summing circuit the black printer signal, together with a colour correction signal if desired.

Figure 4:
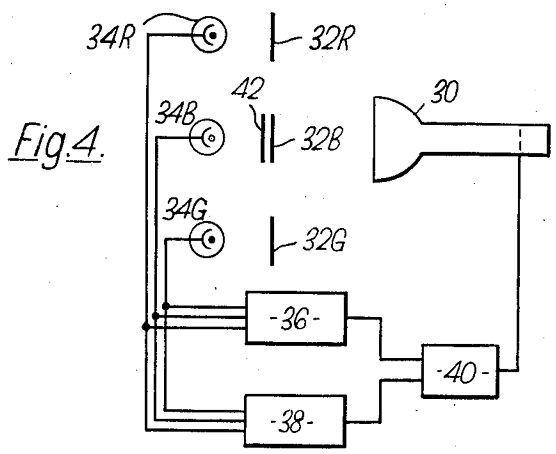
FIGURES 4 and 5 show a feed-back system in which the photographic emulsion to form the black printer is exposed through one of the separation transparencies.

The apparatus used to carry out optical subtraction of the black printer information may take the form described in our co-pending application Serial No. 654,408, and shown diagrammatically in FIGURE 4. In this apparatus, light from a cathode ray tube 30 passes through three separation transparencies 32R, 32B and 32G to three photo-multipliers 34R, 34B and 34G, the output signals from these photo-multipliers representing the colour channel signals. These colour channel signals are applied in the first place to a colour correction computer 36, which may be of conventional design, and which provides as its output a signal representing the correction which is to be applied to a selected one of the separation transparencies. The colour channel signals are also applied to a computer 38 which is the black printer signal computer represented by the circuits of FIGURE 1 or FIGURE 3, and the output of which represents the black printer signal. The correcting signal and the black printer signal are combined in an amplifier 40 and are applied to the grid of the cathode ray tube 30 which scans the colour separation transparencies, to form on the face of the latter a light mask representing the required modification of the colour separation transparency. The photographic plate 42 to be exposed is of the light-transmitting kind and is placed immediately behind and substantially in contact with the colour separation transparency (assumed to be the transparency 32B) for which the correction signal has been computed. Thus the printing plate is exposed with information representing at each element the transmission factor of the corresponding element of the separation transparency modified by the brightness value of the light spot on the face of the cathode ray tube, and consequently the total exposure of this photographic plate corresponds to the image on the colour separation transparency modified by the colour correction and undercolour removal images. The light which exposes this photographic plate passes through the latter to the photo-multiplier 34B, the output of which represents one of the colour channel signals. We have found that the presence in the colour channel signals of modulation due to the fluctuations in brightness of the light spot on the face of the cathode ray tube does not seriously affect the operation of the apparatus. The system has the advantage that the information recorded on the photographic plate is mainly obtained by contact printing from the colour separation transparency, the modifying information due to the light mask on the cathode ray tube representing only a small part of the total information for the colour printer. Thus, with the system shown in FIGURE 4, the black printer signal obtained from the computer 38 (representing the circuit of FIGURE 1 or FIGURE 3) is used for undercolour removal or neutral compression in the corrected colour printers.

Figures 5, 6:
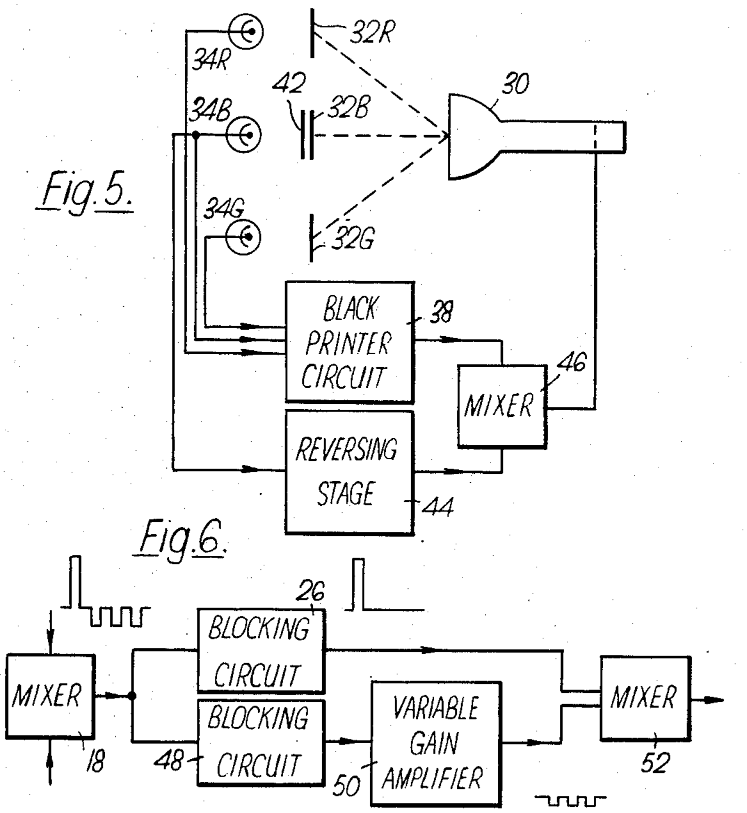
FIGURE 6 illustrates a modification of the apparatus of FIGURE 2.

FIGURE 5 shows in block diagram from an arrangement in which the black printer plate is exposed through a transparency, which is in this case a colour separation transparency. The black printer plate 42 to be exposed is placed behind the colour separation transparency 32B (in the cae which is being considered) and the remaining colour separation transparencies 32R and 32G are placed in the outer positions in the apparatus. As before, the light from the cathode ray tube 30 passes through the transparencies 32R and 32G to photo-multipliers 34R and 34G respectively and passes through the combination of the transparency 32B and the light-transmitting printing plate 42 to a photo-multiplier 34B, the signals from the three photo-multipliers representing the red, blue and green colour channel signals. The three colour channel signals are applied to a black printer circuit 38, which corresponds to the circuits of FIGURE 1 or FIGURE 3, and the output of the middle photo-multiplier 34B is also applied to a reversing stage 44. The output signals from the black printer circuit 38 and the reversing stage 44 are applied in opposite polarities to a mixer 46, the output of which is applied to the grid of the cathode ray tube 30.

In this arrangement, the signal from the middle photo-multiplier (that is to say, the channel in which the black printer plate is being exposed) is passed through a negative feed-back circuit to the cathode ray tube grid. The negative feed-back loop tends to flatten the contrast in the separation transparency in the middle-channel, and the modulation of the cathode ray tube due to the black printer circuit 38 replaces the suppressed information. By adding the positive black printer signals in the mixer 46 to the negative signals from the middle photo-multiplier, it can be arranged that the grey tones cancel in the mixer 46, with the result that there is no modulation of the light source for grey tones. In these tones, the exposed black printer positive therefore retains the sharp resolution of a contact print.

Cancellation of unwanted colour densities in a black printer made by exposure to a modulated light source through a colour separation transparency may be achieved without using the signal from the middle photo-multiplier.

The arrangement is illustrated in FIGURE 6, in which the signal from the final mixer 18 of FIGURE 3 (or alternatively the final mixer 24 of FIGURE 1) is applied to two blocking circuits, the blocking circuit 26 operating as before to pass only signals corresponding to elements in which the neutral component is relatively large, and the blocking circuit 48 serving to block signals corresponding to elements in which the neutral component is relatively large while passing signals representing the remaining elements of the scanned image. The signals from the blocking circuit 48 pass to a variable amplifier 50 from which at least a part of these signals are fed back negatively through a mixer 52 to the cathode ray tube to reduce the exposure of the black printer in areas in which the neutral component is not relatively large. The mixer 52 also receives the signals from the circuit 26.

Although the circuit arrangements illustrated above are the preferred ones, it may in some cases be desired, in order to produce different pictorial effects, to use the sum of the differences between the minimum signal and each of the remaining two colour channel signals to determine when the minimum signal should be used to expose the black printer.

It will be understood that if the colour channel signals arriving at the minimum and maximum signal selector circuits are negative-going signals (as, for example, when the original or positive separations are scanned instead of negative separations, or when the photocell head amplifier is omitted), these circuits will select the smallest and the largest signals, respectively, in the negative sense.

I claim:

1. Apparatus for obtaining reproductions of coloured originals by a method employing a black printer, comprising, for obtaining the black printer: an electro-optical scanner for deriving colour channel signals representing the primary colour components of scanned elements of the original; a minimum signal selector circuit and a maximum signal selector circuit which each receive all the colour channel signals from the scanner; means for adding the outputs of the minimum signal selector circuit and the maximum signal selector circuit in opposite polarities; and means whereby the exposure of elements of the black printer photographic emulsion corresponding to the said scanned elements is controlled, as a function of the output of the minimum signal selector circuit only when the output of the summing circuit is not greater than a predetermined amount.

2. Apparatus for obtaining colour corrected reproductions of coloured originals, by a method employing a black printer, comprising, for obtaining the black printer: an electro-optical scanner for deriving colour channel signals representing the primary colour components of the original; a minimum signal selector circuit and a maximum signal selector circuit each arranged to receive all the primary colour channel signals; means for amplifying the output of the minimum signal selector circuit with respect to the output of the maximum signal selector circuit; means for subtracting the amplified minimum signal from the maximum signal, to obtain a resultant signal including signal elements of opposite polarities for elements which are predominantly neutral and predominantly coloured respectively, and a blocking circuit to which the output of the subtraction means is applied and which passes to an exposure control means only signals of a polarity such that they represent elements in which the neutral component of the colouration is large in comparison with the maximum primary colour component, the exposure control means serving to control the exposure of the black printer photographic emulsion.

3. Apparatus for obtaining colour corrected reproductions of coloured originals by a method employing a black printer, comprising: an electro-optical scanner for deriving colour channel signals representing the primary colour components of the original; a minimum signal selector circuit and a maximum signal selector circuit each arranged to receive all the primary colour channel signals; a first summing means for adding the output of the minimum signal selector circuit to the output of the maximum signal selector circuit in opposite polarities to obtain an output signal representing the excess of the maximum colour signal over the minimum colour signal; a second summing means for adding the said output signal to the minimum signal to obtain a resultant signal in which predominantly neutral areas and areas of low neutral component are represented by signals of opposite polarity; an exposure control means for a black printer; and a limiter circuit receiving the said resultant and passing to the exposure control means only signals of a polarity such that they represent elements in which the neutral component of the colouration is large in comparison with the maximum primary colour component; the exposure control means serving to control the exposure of the black printer photographic emulsion.

4. Apparatus according to claim 3, in which at least one further summing circuit is interposed between the second summing circuit and the limiter circuit, each further summing circuit adding the output of the preceding summing circuit to the output of the first summing circuit.

5. Apparatus for obtaining reproductions of coloured originals by a method employing a black printer, comprising, for obtaining the black printer: an electro-optical scanner for deriving colour channel signals representing the primary colour components of scanned elements of the original; a minimum signal selector circuit and a maximum signal selector circuit which each receive all the colour channel signals from the scanner, and means whereby the exposure of elements of the black printer photographic emulsion corresponding to the said scanned elements of the original or colour separations is controlled, as a function of the output of the minimum signal selector circuit, said means being responsive to the output of said maximum signal selector circuit and being operative to prevent control by said minimum signal selector circuit when the relative values of the maximum and minimum signals are such that the ratio of the colour components of the highest saturation to the colour component of the least saturation is more than a predetermined value which is substantially constant throughout the range of relative colour component values.

6. Apparatus according to claim 5 in which the black printer photographic emulsion is exposed through a colour separation transparency, by means of a light source modulated in accordance with the black printer exposure control signal.

7. Apparatus according to claim 6, in which the modulating signal is also controlled in accordance with a signal tending to reduce colour densities in the exposure of the black printer.

8. Apparatus for obtaining reproductions of coloured originals by a method employing a black printer, comprising for obtaining a colour printer from which undercolour has been removed;

an electro optical scanner for deriving colour channel signals representing the primary colour components of scanned elements of the original;

a minimum signal selector circuit and a maximum signal selector circuit which each receive all the colour channel signals from the scanner;

means for adding the outputs of the minimum signal selector circuit and the maximum signal selector circuit in opposite polarities;

and means whereby the exposure of elements of the colour printer photographic emulsion corresponding to the said scanned elements is modified as a function of the output of the minimum signal selector circuit only when the output of the summing circuit is not greater than a predetermined amount.

9. Apparatus for obtaining colour corrected reproductions of coloured originals, by a method employing a black printer, comprising, for obtaining a colour printer from which undercolour has been removed:

an electro-optical scanner for deriving colour channel signals representing the primary colour components of the original;

a minimum signal selector circuit and a maximum signal selector circuit each arranged to receive all the primary colour channel signals;

means for amplifying the output of the minimum signal selector circuit with respect to the output of the maximum signal selector circuit;

means for subtracting the amplified minimum signal from the maximum signal, to obtain a resultant signal including signal elements of opposite polarities for elements which are predominantly neutral and predominantly coloured respectively, and a blocking circuit to which the output of the subtraction means is applied and which passes to an exposure control means only signals of a polarity such that they represent elements in which the neutral component of the colouration is large in comparison with the maximum primary colour component, the exposure control means serving to modify the exposure of the colour printer photographic emulsion so as to remove undercolour from the colour printer.

10. Apparatus for obtaining colour corrected reproductions of coloured originals by a method employing a black printer, comprising:

an electro-optical scanner for deriving colour channel signals representing the primary colour components of scanned elements of the original;

a minimum signal selector circuit and a maximum signal selector circuit each arranged to receive all the primary colour channel signals;

a first summing means for adding the output of the minimum signal selector circuit to the output of the maximum signal selector circuit in opposite polarities to obtain an output signal representing the excess of the maximum colour signal over the minimum colour signal;

a second summing means for adding the said output signal to the minimum signal to obtain a resultant signal in which predominantly neutral areas and areas of low neutral component are represented by signals of opposite polarity;

an exposure control means for a colour printer;

and a limiter circuit receiving the said resultant and passing to the exposure control means only signals of a polarity such that they represent elements in which the neutral component of the colouration is large in comparison with the maximum primary colour component;

the exposure control means serving to modify the exposure of the colour printer photographic emulsion so as to remove undercolour from the colour printer.

11. Apparatus for obtaining reproductions of coloured originals by a method employing a black printer, comprising, for obtaining a colour printer from which undercolour has been removed:

an electro-optical scanner for deriving colour channel signals representing the primary colour components of scanned elements of the original;

a minimum signal selector circuit and a maximum signal selector circuit which each receive all the colour channel signals from the scanner, and means whereby the exposure of elements of the color printer photographic emulsion corresponding to the scanned elements is controlled as a function of the output of the minimum signal selector circuit, said means being responsive to the output of said maximum signal selector circuit and being operative to prevent control by said minimum signal selector circuit when the relative values of the maximum and minimum signals are such that the ratio of the colour components of the highest saturation to the colour component of the least saturation is more than a predetermined value which is substantially constant throughout the range of relative colour component values.

12. Apparatus according to claim 5 in which the black printer photographic emulsion is exposed through a transparency prepared by exposure of the original to white light, by means of a light source modulated in accordance with the black printer exposure control signal.

References Cited by the Examiner

UNITED STATES PATENTS

| | | | |
|---|---|---|---|
| 2,947,805 | 8/60 | Moe et al. | 178—5.2 |
| 2,976,349 | 3/61 | Thompson | 178—5.2 |
| 2,993,954 | 7/61 | Allen et al. | 178—5.2 |

DAVID G. REDINBAUGH, *Primary Examiner.*

ROBERT SEGAL, *Examiner.*